Figure 1:
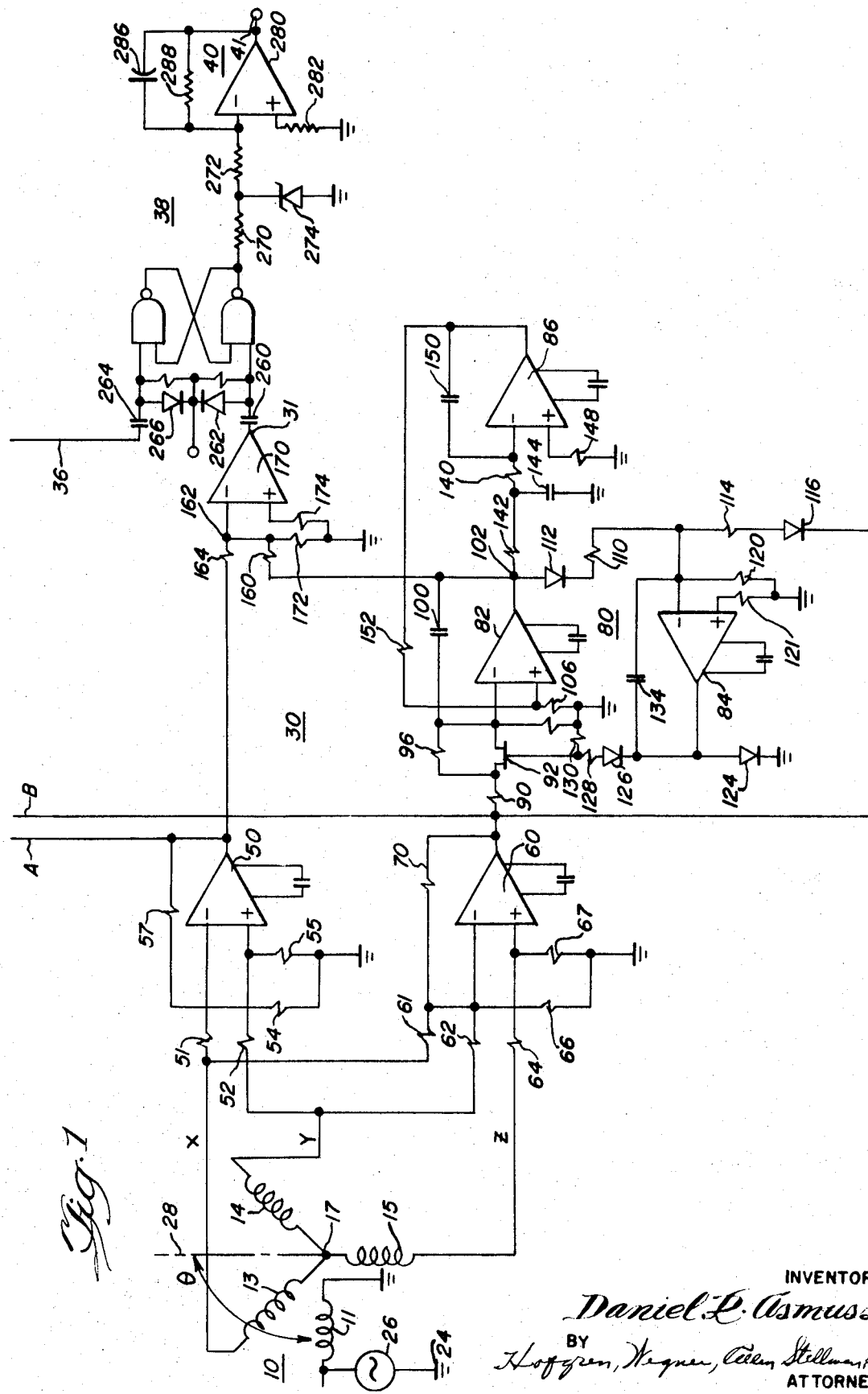

United States Patent
Asmussen

[15] 3,676,659
[45] July 11, 1972

[54] DEMODULATOR FOR ANGULARLY RELATED SIGNALS

[72] Inventor: Daniel R. Asmussen, Kirkland, Wash.
[73] Assignee: United Control Corporation
[22] Filed: Oct. 19, 1970
[21] Appl. No.: 81,899

[52] U.S. Cl. .......................... 235/186, 235/189, 340/347 SY
[51] Int. Cl. .......................................................... C06g 7/22
[58] Field of Search ........ 328/133, 155; 340/347 SY, 347 CC; 235/186, 189

[56] References Cited

UNITED STATES PATENTS

| | | | |
|---|---|---|---|
| 3,430,227 | 2/1969 | Hillis | 340/347 SY |
| 3,482,242 | 12/1969 | Hargrove | 340/347 SY |
| 3,440,644 | 4/1969 | Burgis et al. | 340/347 SY |
| 3,335,417 | 8/1967 | Adler et al. | 340/347 SY |
| 3,357,012 | 12/1967 | Brook | 340/347 SY |
| 3,438,026 | 4/1969 | Prill et al. | 340/247 SY |
| 3,495,078 | 2/1970 | James et al. | 235/189 |

Primary Examiner—Joseph F. Ruggiero
Attorney—Hofgren, Wegner, Allen, Stellman & McCord

[57] ABSTRACT

A demodulator for signals representing the angular position $\theta$ of a rotor in a synchro or resolver generates a corrected reference signal phase offset from the signal energizing the rotor winding by the amount of inherent phase shift $\phi$ occurring during signal transfer between the rotor and stator windings. The corrected reference signal is compared with a stator derived signal, produced by subtracting, adding, and 90° phase shifting signals from the stator windings, to produce a rectangular wave which is integrated to produce a DC voltage representing the true rotor angle $\theta$. The 90° phase shift is accomplished by an operational amplifier integrator which includes an AGC amplifier and a drift stabilizing amplifier.

12 Claims, 2 Drawing Figures

DEMODULATOR FOR ANGULARLY RELATED SIGNALS

This invention relates to a demodulator for angularly related signals, and more particularly to a demodulator for signals from synchros, resolvers, or the like.

Typical solid state converters for demodulating the signals from the stator windings of a synchro include a stator angular determining channel coupled to the stator windings for generating a signal phase shifted with respect to a rotor energizing signal in direct proportion to the rotor shaft position $\theta$. The channel includes circuits which subtract combinations of the stator signals, sum combinations of the stator signals, and 90° phase shift certain combinations of signals before combining signals to produce the phase shifted stator signal. The 90° phase shift generally is accomplished by simple RC capacitor arrangements, sometimes associated with an emitter-follower.

To detect the rotor shaft angle $\theta$, the phase shifted stator signal from the stator channel is compared with the rotor energizing signal. To convert the rotor energizing signal to a form more easily comparable with the phase shifted stator signal, a reference channel typically performs simple signal conversions such as differentiating and/or squaring. After comparison, a rectangular wave is produced having a duty cycle proportional to the phase difference between the rotor energizing signal and the phase shifted stator signal. The rectangular wave is converted to a DC signal by any suitable circuit, as by filtering in a low pass filter.

Significant errors occur in systems of the above type due to failure to compensate for inherent phase shift $\phi$ which occurs with the synchro itself, and due to frequency shift errors. Synchros, resolvers and the like have an inherent phase shift $\phi$ (not to be confused with the cyclical outputs caused by the shaft angle $\theta$) which occurs during signal coupling between the rotor winding and the stator windings. This undesirable phase shift $\phi$ may be on the order of 8°–10°, and prior solid state converters could not distinguish between the inherent 8°–10 phase shift $\phi$ and a misalignment of stator by 8°–10°.

Prior 90° phase shift networks have been calibrated for the frequency of the excitation signal applied to the rotor winding, such as 400 Hertz. When the line frequency shifts to 380 to 420 Hertz, for example, the phase shift typically changes to 88.8° or 91.2°, respectively, which introduces an error in the final calculated signal.

In accordance with the present invention, errors caused by the inherent phase shift $\phi$ and errors caused by frequency shifts and calibration misalignments are eliminated. This is accomplished by modifying the reference channel so as to produce a corrected reference excitation signal which is phase offset by the amount of the inherent phase shift $\phi$ in the synchro. Circuits coupled to the stator windings determine the zero crossing of stator signal combinations which correspond to the zero crossing of the rotor excitation signals except for the inherent phase shift $\phi$. The detected zero crossing is used to shift a stored rotor excitation signal in order to produce a corrected excitation signal which, when compared with the phase shifted stator signal, produces a signal solely dependent on the true shaft angle $\theta$.

Also in accordance with the present invention, a unique 90° phase shift network is formed by an operational amplifier integrator circuit. The integrator circuit includes an automatic gain control which maintains a constant output magnitude for changes in frequency. A drift stabilizing amplifier is connected in a feedback arrangement in the integrator circuit to reduce the drift of the integrator.

One object of the present invention is the provision of an improved demodulator for eliminating the effect of the inherent synchro phase shift $\phi$ in order to calculate the true rotor angle $\theta$.

Another object of the present invention is the provision of an improved 90° phase shift network in a demodulator in order to eliminate frequency shift errors and phase shift network calibration errors.

Figure 2:
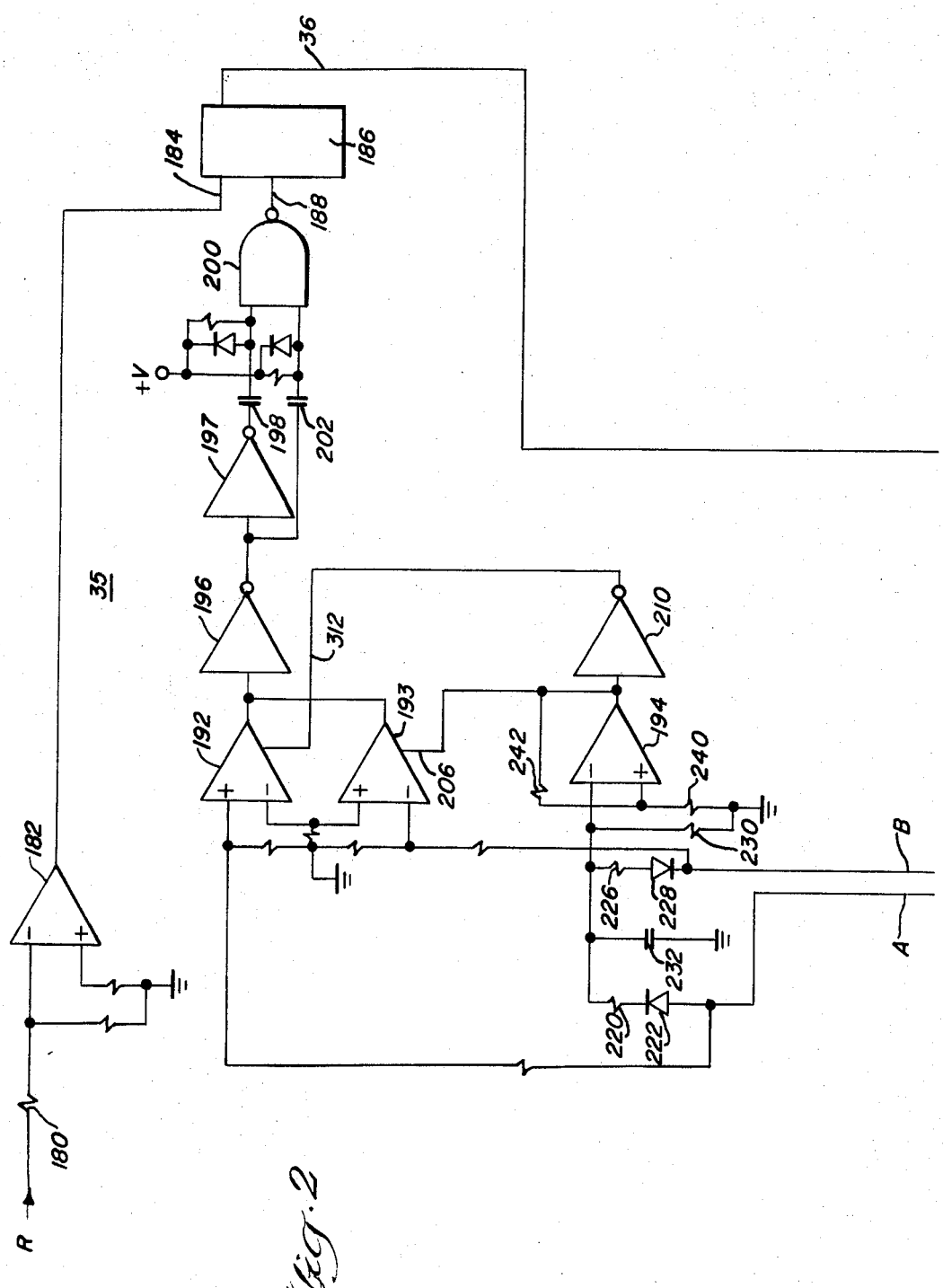

Further objects and features of the invention will be apparent from the following description, and from the drawings, in which:

FIG. 1 is a schematic diagram of a portion of the converter including an angular conversion channel and a pulse width to DC demodulator channel; and FIG. 2 is a schematic diagram of the remaining portion of the converter including a phase shift correction channel and a reference channel.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values will be given for certain of the components in order to disclose a complete, operative embodiment of the invention. However, it should be understood that such values are merely representative and are not critical unless specifically so stated.

GENERAL OPERATION

Turning to the drawings, a converter is illustrated for a source 10 of angularly related signals, see FIG. 1. For illustration, source 10 is in the form of a synchro having a primary or rotor winding 11 movable with respect to three secondary or stator windings 13, 14 and 15, but the source may also be a resolver or similar device. One end of each stator winding is joined to a common junction 17. The opposite ends of the stator windings 13, 14 and 15 are externally available on lines X, Y, and Z, respectively. Rotor winding 11 is energized by a source 26 of AC signal, as 400 Hertz frequency. Source 26 is coupled to one side of rotor winding 11, and to the other side via a source of reference potential or ground 24. As is well known, the output signals on lines X, Y and Z bear a predetermined relation dependent upon the shaft angle $\theta$ between the rotor winding 11 and a reference axis 28 of the synchro.

To demodulate the signals from the synchro, a stator angular determining channel 30 combines the X, Y and Z signals to form on a line 31 a combined signal phase shifted with respect to the AC signal from source 26 by an amount directly proportional to the shaft angle $\theta$. Undesirably, the signal on line 31 also contains an additional phase shift $\phi$, typically on the order of 8°–10°, which represents the inherent phase between the 400 Hertz excitation signal applied to the rotor winding 11 and the 400 Hertz output signals X, Y and Z from the stator windings 13, 14 and 15, when the shaft angle $\theta$ is maintained at 0°.

In order to determine only the true shaft angle $\theta$, a reference channel 35, FIG. 2, has an input R directly coupled to the excitation source 26, and additional inputs A and B coupled to the stator channel 30 in order to modify the reference excitation signal R so as to produce on a line 36 a corrected reference signal synchronous with the energizing signal from source 26, but phase offset therefrom by the amount of the inherent phase shift $\phi$ produced in the synchro.

The true shaft angle $\theta$ is represented by the amount of phase shift of the signal on line 31 with respect to the phase of the corrected reference signal on line 36. To decode this phase relationship, lines 31 and 36 are coupled to the inputs of a flip-flop or latch circuit 38, FIG. 1. The output of latch 38 is a pulse or rectangular wave having a duty cycle or pulse width directly proportional to the true shaft angle $\theta$, independent of the inherent phase shift $\phi$. This rectangular wave can be demodulated by any suitable technique for converting pulse width to DC, as by using a low pass filter, by counting at a high rate such as 1 megahertz, by dual ramp conversion, or the like. Illustratively, a low pass filter is formed by an integrator 40 which produces on an output line 41 a DC voltage $\theta_{DC}$ having an amplitude directly proportional to the shaft angle $\theta$. The amplitude of the DC voltage $\theta_{DC}$ has a unique value for all angles of $\theta$ from 0° through 360°.

Throughout the circuit, differential amplifying devices such as operational amplifiers are utilized to produce on an output line a signal which is the difference between a pair of signals coupled to a pair of inputs. As in conventional, the (+) input is a nonainverting input, while the (−) input produces an inverted signal at the output. While all such devices will be identified as operational amplifiers, it will be apparent that other differential amplifying devices or circuits could be substituted in place thereof.

STATOR CHANNEL

Considering the converter in detail, the output voltages from the stator windings, ignoring the phase shift inherent in the synchros, may be defined as follows:
- (1). $X = E\sin\omega t \cos(\theta+120°)$
- (2). $Y = E\sin\omega t \cos(\theta+240°)$
- (3). $Z = E\sin\omega t \cos(\theta)$ In the above, E represents peak voltage. It will be appreciated that the above equations are commonly used to define the actual output voltages from the synchro, but in fact these equations ignore the inherent phase shift $\phi$ occurring in the synchro. Properly, the term $E\sin\omega$ should be written $E\sin(\omega t + \phi)$, where $\phi$ is the phase shift in the synchro. Since $\phi$ is a constant, the equations explaining the converter operation will be written in terms of $E\sin\omega t$ for simplification, but it should be remembered that the actual sinusoidal quantity is $E\sin(\omega t + \phi)$. The effect of the additional $\phi$ factor will be explained later.

Stator channel 30 includes an operational amplifier 50 having its (−) input coupled through a 200 kilohm resistor 51 to the X signal, and its (+) input coupled through a 200 kilohm resistor 52 to the Y signal. Both the (−) and (+) inputs are bypassed to ground 24 through separate 5.0 kilohm resistors 54 and 55. A 100 kilohm feedback resistor 57 is connected between the output of operational amplifier 50, identified as line A, and the (−) input thereof. Amplifier 50 takes the difference between the X and Y signals, producing the following signal output on line A:

$$A = \frac{1}{2}(X - Y)$$

$$= \frac{1}{2}(E\sin\omega t \cos(\theta+120°) - E\sin\omega t \cos(\theta+240°))$$

$$= \frac{1}{2}(E\sin\omega t [\cos(\theta+120°) - \cos(\theta+240°)])$$

$$= \frac{1}{2}(E\sin\omega t [\cos\theta\cos 120° - \sin\theta\sin 120°$$

$$- \cos\theta\cos 240° + \sin\theta\sin 240°])$$

$$= \frac{1}{2}\left(E\sin\omega t \left[\cos\theta\left(-\frac{1}{2}\right) - \sin\theta\left(\frac{\sqrt{3}}{2}\right)\right.\right.$$

$$\left.\left. - \cos\theta\left(-\frac{1}{2}\right) + \sin\theta\left(-\frac{\sqrt{3}}{2}\right)\right]\right)$$

$$= \frac{1}{2}\left(E\sin\omega t \left[\cos\theta\left(-\frac{1}{2}+\frac{1}{2}\right) - \sin\theta\left(\frac{\sqrt{3}}{2}+\frac{\sqrt{3}}{2}\right)\right]\right)$$

$$= -\frac{\sqrt{3}}{2} E\sin\omega t \sin\theta \quad (4)$$

Stator channel 30 also includes an operational amplifier 60 having its (−) input coupled through a 200 kilohm resistor 61 to the X signal, and through a 200 kilohm resistor 62 to the Y signal. The (+) input is coupled through a 100 kilohm resistor 64 to the Z input. Both the (−) and (+) inputs are coupled to ground 24 through a 5 kilohm resistor 66 and a 4.44 kilohm resistor 67, respectively. A 57.74 kilohm resistor 70 serves as a feedback between the output of operational amplifier 60, identified as line B, and the (−) input thereof. In operation, amplifier 60 sums the X and Y signals with respect to the Z signal, producing the following output at line B:

$$B = \frac{1}{2}(X+Y) - 2Z)$$

$$= \frac{1}{2}(E\sin\omega t \cos(\theta+120°) + E\sin\omega t \cos(\theta+240°)$$

$$- 2E\sin\omega t \cos\theta)$$

$$= \frac{1}{2}(E\sin\omega t [\cos(\theta+120°) + \cos(\theta+240°)]$$

$$- 2E\sin\omega t \cos\theta)$$

$$= \frac{1}{2}(E\sin\omega t [\cos\theta\cos 120° - \sin\theta\sin 120°$$

$$+ \cos\theta\cos 240° - \sin\theta\sin 240°] - 2E\sin\omega t \cos\theta)$$

$$= \frac{1}{2}\left(E\sin\omega t \left[\cos\theta\left(-\frac{1}{2}\right) - \sin\theta\left(\frac{\sqrt{3}}{2}\right)\right.\right.$$

$$\left.\left.+ \cos\theta\left(\frac{1}{2}\right) - \sin\theta\left(-\frac{\sqrt{3}}{2}\right)\right] - 2E\sin\omega t \cos\theta\right)$$

$$= \frac{1}{2}\left(E\sin\omega t \left[\cos\theta\left(-\frac{1}{2}-\frac{1}{2}\right) - \sin\theta\left(\frac{\sqrt{3}}{2}-\frac{\sqrt{3}}{2}\right)\right]\right.$$

$$\left.- 2E\sin\omega t \cos\theta\right)$$

$$= \frac{1}{2}(-E\sin\omega t \cos\theta - 2E\sin\omega t \cos\theta)$$

$$= \frac{1}{2}(-3E\sin\omega t \cos\theta)$$

The resistor 70 reduces the gain through the amplifier by $\frac{\sqrt{3}}{3}$ so that B becomes $$B = -\frac{\sqrt{3}}{2} E\sin\omega t \cos \quad (5)$$

The signal B is coupled to an integrator circuit 80 modified so as to produce a 90° phase shift regardless of the frequency of source 26. Integrator circuit 80 includes an operational amplifier 82 connected in a basic integrator circuit in which the output magnitude represents a 90° phase shift, but the output is a linear function of frequency. An operational amplifier 84 is connected as an automatic gain control (AGC) to keep the output from amplifier 82 at a constant magnitude for changes in frequency, thereby eliminating frequency shift and calibration errors. An operational amplifier 86 samples the steady state drift of the integrator amplifier 82, and reduces the drift by a factor of approximately 40,000, thereby performing the function of a drift stabilizing amplifier, as found in analog computers.

Considering integrator circuit 80 in more detail, output line B from amplifier 60 is coupled through a 100 kilohm resistor 90 and through a field effect transistor (FET) 92 to the (−) input of operational amplifier 82. The FET 92 is shunted by a 20 kilohm resistor 96. In order to function as an integrator, a 0.033 microfarad feedback capacitor 100 is coupled between an output line 102 of amplifier 82 and its (−) input. The (+) input is bypassed to ground 24 through a 10 kilohm resistor 106.

The AGC amplifier 84 has its (−) input coupled through a 100 kilohm resistor 110 and a diode 112 to output line 102 of amplifier 82, and through a 100 kilohm resistor 114 and a diode 116 (with characteristics matched to diode 112) to line B from amplifier 60. The (−) and (+) inputs of amplifier 84 are shunted to ground 24 through 10 kilohm and 8.2 kilohm resistors 120 and 121, respectively. The output of amplifier 84 is shunted to ground 24 through a diode 124 poled to pass positive signals from amplifier 84. Negative signals from amplifier 84 are passed through a diode 126 and a 91 kilohm resistor 128 to the gate of FET 92. The gate is shunted to ground 24 through a 10 kilohm resistor 130. Amplifier 84 also includes a 10 microfarad feedback capacitor 134 coupled between the output and the (−) input thereof.

The drift stabilizing amplifier 86 has its (−) input coupled through a pair of series connected 50 kilohm resistors 140 and 142 to output line 102 of amplifier 82. The junction between the resistors 142 and 140 is coupled to ground 24 through a 5 microfarad capacitor 144. The (+) input of amplifier 86 is coupled to ground 24 through a 100 kilohm resistor 148. A 10 microfarad feedback capacitor 150 is coupled between the output of amplifier 86 and the (−) input. The output is also coupled through a 10 megohm resistor 152 to the (+) input of amplifier 82.

In operation, amplifier 82 integrates with respect to time the signal from amplifier 60, producing:

$$\frac{1}{2}\sqrt{3}\frac{1}{\omega}E\cos\omega t\cos\theta \quad (6)$$

The function of the AGC amplifier 84 is to eliminate the frequency dependent coefficient $1/\omega$ which is produced by the integration with respect to time. As previously mentioned, amplifier 86 is connected as a drift stabilizing amplifier, reducing the steady state drift of the integrator 82 by a factor of approximately 40,000. The resulting signal on line 102 is coupled through a 20 kilohm summing resistor 160 to a summing junction 162 which has another 20 kilohm summing resistor 164 coupled therebetween the output of amplifier 50. The resulting signal at summing junction 162 is therefore:

$$\left(\frac{-\sqrt{3}}{2}E\sin\omega t\sin\theta\right)+\left(\frac{-\sqrt{3}}{2}E\cos\omega t\cos\theta\right)$$

$$=\frac{-\sqrt{3}}{2}E(\sin\omega t\sin\theta+\cos\omega t\cos\theta)$$

$$=\frac{-\sqrt{3}}{2}E(\cos\theta-\omega t) \quad (7)$$

The above signal at summing junction 162 is directly coupled to the (−) input of an operational amplifier 170 which is connected open-loop to produce an output square wave whose phase is shifted linearly with shaft position and inherent phase shift. The (−) and (+) inputs of amplifier 170 are coupled through a pair of 10 kilohm and 5 kilohm resistors 172 and 174, respectively, to ground 24. The output of amplifier 170, corresponding to line 31, is therefore a square wave signal corresponding to the signal at summing junction 162. Considering now the inherent phase shift $\phi$ in the above equations, the output signal at line 31 in fact is represented by:

$$\frac{-\sqrt{3}}{2}E\sin(\theta+\omega t+\phi) \quad (8)$$

In order to compare this signal with the rotor reference signal in order to determine shaft angle $\theta$, it is necessary to generate a modified reference signal which contains a function of $\phi$, so that a comparison therebetween will eliminate the factor $\phi$. This is accomplished by the reference channel 35.

The circuit of FIG. 1 can be modified by coupling the signal A output of amplifier 50 into the integrator 80, and connecting the B signal output from amplifier 60 directly into amplifier 170. The resulting output signal from amplifier 170 would be a function of $\sin(\theta+\omega t)$ which amounts to an equivalent rotation of the shaft angle $\theta$ by 90°. The reference channel 35, or the phase shift to DC decoder, could be appropriately modified to subtract 90° from the shaft angle indication so as to correct for this 90° offset.

REFERENCE CHANNEL

In FIG. 2, reference channel 35 is illustrated in detail. Energizing signal R from generator 26, FIG. 1, is coupled through a 100 kilohm resistor 180 to operational amplifier 182, connected open-loop in order to square the reference signal. The square wave reference signal is then coupled to a signal input 184 of a trigger type flip-flop 186. The reference signal is delayed in time in flip-flop 186 until the reference channel 35 detects a zero crossing the synchro stator output signals A or B from operational amplifiers 50 and 60 of FIG. 1.

When the zero crossing is detected, a triggering signal is generated and coupled to a trigger input 188 of the flip-flop 186. In response to the trigger signal, the flip-flop changes its output to correspond with the signal input, and maintains this output on line 36 until it is again clocked by a trigger signal on line 188. Upon the occurrence of the next trigger signal, the flip-flop again examines the inputs and changes the output on line 36 to correspond with the signal input. Thus, the output on line 36 is a corrected square wave reference signal, shifted in time by an amount equal to the occurrence of the zero crossing of signals on input lines A or B, which corresponds to the time lag caused by the inherent synchro phase shift $\phi$.

To detect the zero crossing of stator signals A and B, a logic circuit is formed using operational amplifiers 192, 193 and 194. The output of both amplifiers 192 and 193 are coupled to a NOT gate 196 and thence through a NOT gate 197 and a capacitor 198 to an input of a NAND gate 200. The output of gate 200 forms the triggering input 188 of flip-flop 186. The opposite input of NAND gate 200 is provided from NOT gate 196 through a 0.01 microfarad capacitor 202.

The output of operational amplifier 194 is coupled to a disabling input 206 to amplifier 193, switching amplifier 193 off when a negative voltage is present. The output of amplifier 194 is also coupled to a NOT gate 210, the output of which is coupled to a disabling input 212 for amplifier 192. When the output of amplifier 194 is positive, amplifier 193 is operative, but NOT gate 210 inverts the positive output to couple a negative signal to disabling input 212, which switches off amplifier 192.

The amplifiers 192, 193 and 194 detect the zero crossing of the larger of the signals A or B as it goes through zero, generating the triggering signal which gates the triggering input 188 of flip-flop 186. Each of the signals A and B goes through a zero crossing as the synchro transmitter is rotated, and the signals go through zero simultaneously. However, since it is difficult to accurately determine the zero-crossing point of low level signal, the larger of the two signals A and B is chosen to form the gating input for flip-flop 186. Amplifiers 192 and 193 are comparators which generate a 400 Hertz square wave, corresponding to the signals A and B, respectively. Amplifier 194 controls the particular amplifier 192 or 193 which is allowed to be operative in order to pass the square wave to NOT gate 196.

Amplifier 194 has its (−) input connected through a 20 kilohm resistor 220 and a diode 222 to the A signal from amplifier 50, FIG. 1. The (−) input is also coupled through a 20 kilohm resistor 226 and a diode 228, oppositely poled with respect to diode 222, to the B signal from amplifier 60, FIG. 1. The (−) input is bypassed to ground 24 through a 10 kilohm resistor 230 and a 1.0 microfarad capacitor 232. The (+) input of amplifier 194 is coupled to ground 24 through a 10 kilohm resistor 240. A 200 kilohm resistor 242 serves as a positive feedback element between the output of amplifier 194 and the (+) input.

In operation, when signal A is larger than signal B, a positive voltage is established at the input to amplifier 194 during the first half of each 400 Hertz cycle. This voltage is inverted in amplifier 194 to produce a negative voltage which, via disabling input 206, switches amplifier 193 into its disabled state. The negative output of amplifier 194 is also inverted by NOT gate 210 to produce a positive voltage at disabling input 212, turning amplifier 292 on and allowing the square wave corresponding to signal A to drive NOT gate 196. When the output of NOT gate 196 switches negative, it drives a pulse through gate 200 to trigger input 188, triggering the flip-flop 186. When the output of NOT gate 196 switches positive, it switches the output of NOT gate 197 negative, also driving a pulse through gate 200 to the triggering input 188. As flip-flop 186 is gated or clocked from gate 200, it permits the 400 Hertz square wave from amplifier 182 to be coupled to the output line 36 which inputs to the latch 38, FIG. 1, for comparison with the phase shifted signal from the stator angular determining channel 30.

When signal B is greater than signal A, a negative voltage is established at the input to amplifier 194 during the second half of each 400 Hertz cycle, applying a positive voltage to disabling input 206 in order to drive on the amplifier 193. The positive output from amplifier 194 is inverted in NOT gate 210 to couple a disabling negative voltage to input 212, turning amplifier 192 off. This allows the square wave signal corresponding to signal B to drive NOT gate 196. The operation is thereafter the same as previously described.

PHASE SHIFT TO DC CONVERTER

Returning to FIG. 1, the latch 38 and integrator 40 are of known design, and serve to compare the phase shifted stator signal on line 31 with the corrected reference signal on line 36. The phase difference therebetween equals the true shaft angle $\theta$ without an error due to the inherent phase shift $\phi$ which occurred in the synchro 10.

Latch 38 operates in a known manner to produce an output rectangular waveform which has a duty cycle directly proportional to the phase difference between the square wave signals on lines 31 and 36. The square wave signal on line 31 is differentiated by a capacitor 260 coupled in series between line 31 and one of a pair of inputs to latch 38. The latch is formed by a pair of NAND gates cross coupled to form a conventional flip-flop. To eliminate positive going spikes, a diode 262 is coupled between capacitor 260 and a source of positive potential or +V. Thus, latch 38 is set once for each cycle of the square wave from line 31.

The corrected reference signal on input 36 is differentiated by a similar circuit. Capacitor 264 serves to differentiate the square wave in order to couple spikes to a reset input of the latch 38. A diode 266 eliminates positive going spikes. The resulting output of the latch 38 is a rectangular waveform which has a duty cycle directly proportional to the phase difference between the square wave signals on lines 31 and 36. To maintain the output rectangular waveform at a constant amplitude, the output is coupled through a pair of series connected resistors 270 and 272 to integrator 40. The junction between resistors 270 and 272 is shunted to ground 24 through a Zener diode 274.

Integrator 40 integrates the variable duty cycle rectangular wave to obtain an output signal $\theta_{DC}$ on line 41, which has a DC amplitude directly proportional to the duty cycle. Integrator 40 consists of an operational amplifier 280 having its (−) input connected to resistor 272, and its (+) input connected through a resistor 282 to ground 24. The output line 41 from operational amplifier 280 is coupled through a parallel connected capacitor 286 and resistor 288 to the (−) input, thereby forming a capacitive feedback element. The resulting output signal $\theta_{DC}$ has a DC amplitude directly linearly proportional to true shaft angle $\theta$, and has been compensated for the effect of the inherent phase shift $\phi$ due to the use of the corrected reference signal for phase comparison.

I claim:

1. In a system having primary winding means coupled to an energizing signal and a plurality of secondary windings having signals impressed thereon dependent upon the angular position of said primary winding means relative to said secondary windings and undesirably dependent upon a signal phase shift occurring during signal transfer between said primary winding means and said secondary windings, a converter circuit for determining said relative angular position independent of said signal phase shift, comprising:

angular channel means coupled to said secondary windings for combining said impressed signals to form a combined signal phase shifted with respect to said energizing signal in direct proportion to said relative angular position and said signal phase shift;

reference channel means coupled to at least said secondary windings and responsive at least partly to said impressed signals for generating a corrected reference signal synchronous with said energizing signal and phase offset therefrom by said signal phase shift; and means for comparing said combined signal with said corrected reference signal to generate an output signal dependent solely on said relative angular position.

2. The converter circuit of claim 1 wherein said reference channel means includes logic means coupled to said secondary windings for determining a zero crossing of a function of said impressed signals, and shifting means responsive to said detected zero crossing for shifting the phase of the corrected reference signal so that it corresponds with the time of occurrence of said detected zero crossing.

3. The converter circuit of claim 2 wherein said shifting means includes storage means coupled to said primary winding means for storing said energizing signal and triggering means responsive to said detected zero crossing for gating the stored energizing signal to said comparing means, whereby the gated stored energizing signal becomes the said corrected reference signal.

4. The converter circuit of claim 2 wherein said angular channel means includes first combining means coupled to said secondary windings for developing a first combined signal and second combining means coupled to said secondary windings for developing a second combined signal different from said first combined signal, and said logic means includes means for selecting the zero crossing of solely said first combined signal or second combined signal.

5. The converter circuit of claim 4 wherein said zero crossing selecting means includes amplitude responsive means for selecting the combined signal having a larger amplitude.

6. The converter circuit of claim 1 wherein said reference channel means includes storage means for storing said energizing signal and time shift means responsive to said impressed signals for time shifting said stored energizing signal until its phase corresponds with the amount of signal phase shift.

7. The converter circuit of claim 6 wherein said storing means comprises a flip-flop having a signal input coupled to said energizing signal and a triggering input for gating out a signal from the flip-flop, and means connecting said triggering input to said time shift means.

8. In a system having primary winding means coupled to an energizing signal and a plurality of secondary windings having signals impressed thereon dependent upon the angular position of said primary winding means relative to said secondary windings, a converter circuit for determining said relative angular position, comprising:

first combining means coupled to said secondary windings for developing a first combined signal;

second combining means coupled to said secondary windings for developing a second combined signal different than said first combined signal;

90° phase shift means including differential amplifying for producing at output means a signal proportional to the difference between signals coupled to a pair of input means, means coupling said first combining means to the input means of said differential amplifying means, and capacitor feedback means connected between said output means and said input means to cause said first combined signal to be integrated; and means for combining said integrated signal with said second combined signal to form an angular representing signal phase shifted with respect to said energizing signal in direct proportion to said relative angular position.

9. The converter circuit of claim 8 wherein said 90° phase shift means includes AGC means coupled to said differential amplifying means for maintaining a constant signal magnitude at said output means independent of changes in frequency of said energizing signal.

10. The converter circuit of claim 8 wherein said 90° phase shift means includes a drift stabilizing amplifier having an input coupled to said output means for sampling the steady state drift of said differential amplifying means and an output connected to said input means for reducing the steady state drift of the differential amplifying means.

11. The converter circuit of claim 8 in a synchro system having three secondary windings having three signals impressed thereon, wherein one of said combining means includes adder means for summing a pair of said three signals to generate a summation combined signal, and the other of said combining means includes subtractor means for subtracting a pair of said three signals to generate a subtraction combined signal.

12. The converter circuit of claim 11 wherein said other combining means includes subtractor differential amplifying means having a pair of subtractor input means, and said subtraction means includes a pair of resistive means coupled between a pair of said secondary windings and said pair of subtractor input means, respectively.

* * * * *